US012560006B2

(12) United States Patent
Goldstein et al.

(10) Patent No.: US 12,560,006 B2
(45) Date of Patent: Feb. 24, 2026

(54) LOW PROFILE MULTI-POINT LOCK DRIVE

(71) Applicants: Michael Reilly Design, Incorporated, Calverton, NY (US); Pella Corporation, Pella, IA (US)

(72) Inventors: Jeremy Goldstein, Patchogue, NY (US); Andrew Morse, Altoona, IA (US); Benjamin Edwards, Westhampton Beach, NY (US); Steve Johnson, Calverton, NY (US); Jeffrey Bernath, Calverton, NY (US)

(73) Assignee: Michael Reilly Design, LLC, Calverton, NY (US)

( * ) Notice: Subject to any disclaimer, the term of this patent is extended or adjusted under 35 U.S.C. 154(b) by 66 days.

(21) Appl. No.: 18/127,909

(22) Filed: Mar. 29, 2023

(65) Prior Publication Data

US 2024/0110415 A1 Apr. 4, 2024

Related U.S. Application Data

(60) Provisional application No. 63/324,963, filed on Mar. 29, 2022.

(51) Int. Cl.

*E05C 9/04* (2006.01)
*E05B 63/08* (2006.01)
*E05B 63/14* (2006.01)

(52) U.S. Cl.

CPC .............. *E05C 9/046* (2013.01); *E05B 63/14* (2013.01); *E05B 63/08* (2013.01)

(58) Field of Classification Search

CPC .......... E05C 9/046; E05C 9/10; E05C 9/1875; E05C 9/04; E05B 63/14; E05B 63/08; Y10T 292/1083; Y10T 292/1089; Y10T 292/0848; Y10T 292/086

See application file for complete search history.

(56) References Cited

U.S. PATENT DOCUMENTS

| | | | | |
|---|---|---|---|---|
| 1,131,752 A | | 3/1915 | Voigt | |
| 1,144,537 A | | 6/1915 | Gabriel | |
| 1,370,928 A | | 3/1921 | Swanson | |
| 1,794,171 A | * | 2/1931 | Grutel | E05C 9/046 292/45 |
| 1,934,105 A | | 11/1933 | Totty | |
| 2,223,765 A | | 12/1940 | Komenak | |
| 2,225,663 A | | 12/1940 | Segal | |

(Continued)

FOREIGN PATENT DOCUMENTS

| | | | | |
|---|---|---|---|---|
| AU | 1473499 A | * | 4/1999 | E05B 59/00 |
| CA | 2987618 C | * | 1/2020 | E05B 15/0013 |

(Continued)

*Primary Examiner* — Steven A Tullia

(57) ABSTRACT

A multipoint lock including a pivoting lock bolt including a fixed pivot point and a sliding pivot point, a translating lock bolt, a linkage coupled to and configured to pivot the pivoting lock bolt and to translate the translating lock bolt, an actuation mechanism configured to actuate the linkage and to effect pivoting of the pivoting lock bolt and translation of the translating lock bolt, and an input mechanism configured to receive user input and transmit the user input to the actuation mechanism, the user unput including shifting the input mechanism between an unlocked position and a locked position.

24 Claims, 11 Drawing Sheets

(56) References Cited

U.S. PATENT DOCUMENTS

| | | | | |
|---|---|---|---|---|
| 2,238,066 | A | 4/1941 | Mantz | |
| 2,326,069 | A | 8/1943 | Samzelius | |
| 2,387,187 | A | 10/1945 | Smith | |
| 2,498,508 | A | 2/1950 | Rudolph | |
| 2,989,859 | A * | 6/1961 | Eads | E05B 63/0013 292/5 |
| 3,019,043 | A | 1/1962 | Woodworth | |
| 3,342,516 | A | 9/1967 | Morand | |
| 4,511,166 | A | 4/1985 | Weinerman | |
| 4,643,005 | A * | 2/1987 | Logas | E05C 9/026 70/95 |
| 5,022,691 | A * | 6/1991 | Clay, Jr. | E05C 3/30 292/121 |
| 5,058,938 | A * | 10/1991 | Doring | E05C 9/026 292/335 |
| 6,152,498 | A * | 11/2000 | Lindqvist | E05C 9/1875 292/96 |
| 6,282,929 | B1 * | 9/2001 | Eller | E05C 9/026 70/109 |
| 6,327,879 | B1 | 12/2001 | Malsom | |
| 6,672,632 | B1 | 1/2004 | Speed | |
| 6,733,051 | B1 * | 5/2004 | Cowper | E05B 63/242 292/192 |
| 7,604,265 | B2 | 10/2009 | Tsai | |
| 7,837,241 | B2 * | 11/2010 | Chung | E05C 9/1875 292/199 |
| 7,963,573 | B2 * | 6/2011 | Blomqvist | E05C 9/1875 292/26 |
| 8,348,308 | B2 * | 1/2013 | Hagemeyer | E05C 9/006 292/139 |
| 8,398,126 | B2 * | 3/2013 | Nakanishi | E05C 9/041 292/DIG. 60 |
| 8,550,506 | B2 * | 10/2013 | Nakanishi | E05C 9/04 292/DIG. 21 |
| 8,827,324 | B2 | 9/2014 | Furgiuele | |
| 8,899,635 | B2 * | 12/2014 | Nakanishi | E05B 63/0056 292/194 |
| 9,428,940 | B1 * | 8/2016 | Patrick | E05C 1/16 |
| 9,624,701 | B2 * | 4/2017 | Taylor | E05C 9/04 |
| 9,890,570 | B2 * | 2/2018 | Horwood | E05C 3/124 |
| 10,378,243 | B2 | 8/2019 | Ke et al. | |
| 2004/0145189 | A1 | 7/2004 | Liu | |
| 2004/0195841 | A1 | 10/2004 | Liu | |
| 2004/0227349 | A1 | 11/2004 | Denys | |
| 2004/0256860 | A1 | 12/2004 | Tsai | |
| 2006/0091679 | A1 | 5/2006 | Tsai | |
| 2006/0130543 | A1 | 6/2006 | Alchin | |
| 2007/0259551 | A1 | 11/2007 | Rebel | |
| 2007/0290511 | A1 | 12/2007 | Liang | |
| 2008/0256992 | A1 * | 10/2008 | Chung | E05B 65/0811 70/77 |
| 2008/0258475 | A1 | 10/2008 | Chung | |
| 2008/0265587 | A1 * | 10/2008 | Nakanishi | E05B 63/042 292/26 |
| 2009/0134634 | A1 | 5/2009 | Atkinson | |
| 2010/0037525 | A1 | 2/2010 | Sato | |
| 2014/0159387 | A1 * | 6/2014 | Hagemeyer | E05C 3/16 292/196 |
| 2018/0058105 | A1 | 3/2018 | Van | |
| 2019/0292820 | A1 * | 9/2019 | Ritzert | E05B 59/00 |

FOREIGN PATENT DOCUMENTS

| | | | | |
|---|---|---|---|---|
| CH | 694946 | A5 * | 9/2005 | E05C 9/1841 |
| DE | 2929776 | A1 * | 2/1980 | E05B 65/08 |
| DE | 2932471 | A1 * | 2/1981 | E05B 65/00 |
| DE | 3715044 | A1 * | 11/1988 | E05C 9/046 |
| DE | 3427713 | C2 * | 4/1991 | E05C 9/026 |
| DE | 4222629 | A1 * | 1/1994 | E05C 9/1875 |
| DE | 20017799 | U1 * | 12/2000 | E05C 9/1875 |
| DE | 102004012108 | B4 * | 2/2006 | E05C 9/026 |
| DE | 202005012859 | U1 * | 2/2007 | E05C 9/16 |
| DE | 202009003976 | U1 * | 9/2010 | E05C 7/04 |
| EP | 0325215 | A2 * | 7/1988 | E05C 9/023 |
| EP | 0552505 | A1 * | 7/1993 | E05C 9/06 |
| EP | 1790802 | A2 * | 5/2007 | E05C 9/1875 |
| EP | 2072725 | A2 * | 6/2009 | E05C 9/047 |
| EP | 2754791 | A1 * | 7/2014 | E05B 17/2092 |
| EP | 2322744 | B1 * | 10/2018 | E05B 17/2034 |
| EP | 4116529 | B1 * | 10/2023 | E05B 63/0013 |
| FR | 2841584 | A1 * | 1/2004 | E05C 9/004 |
| FR | 2841584 | B1 * | 1/2004 | E05C 9/004 |
| FR | 2900183 | A1 * | 10/2007 | E05C 9/025 |
| FR | 3066521 | B1 * | 7/2019 | E05B 63/042 |
| GB | 2101667 | B * | 12/1984 | E05C 9/043 |
| GB | 2296938 | A * | 7/1996 | E05C 3/124 |
| GB | 2298449 | A * | 9/1996 | E05C 9/042 |
| GB | 2496430 | A * | 5/2013 | E05B 63/0056 |
| KR | 20180040500 | A * | 4/2018 | E05C 9/04 |
| PL | 177007 | B1 * | 9/1999 | E05C 9/1875 |
| SE | 436591 | B * | 1/1985 | E05C 3/16 |
| WO | WO-0233202 | A2 * | 4/2002 | E05B 63/20 |
| WO | WO-2004059114 | A1 * | 7/2004 | E05C 9/06 |
| WO | WO-2012003104 | A1 * | 1/2012 | E05B 15/102 |
| WO | WO-2021152641 | A1 * | 8/2021 | E05B 63/185 |

* cited by examiner

LOW PROFILE MULTI-POINT LOCK DRIVE

BACKGROUND

Multipoint locks may be used with door or window assemblies for a secure locking relationship. The multipoint lock may be used between two separate components such as a hinged panel and a frame, a pair of hinged panels, or other similar components. Multipoint locks in some embodiments require multiple points of activation or may require high force inputs to actuate the multiple locks.

Some multipoint locks are relatively complex and bulky systems that include gearing and other components requiring additional recesses to be formed within associated panels to accommodate the increased profile of such locks

SUMMARY

Various aspects of the present disclosure are directed toward apparatuses, systems, and methods that include a multipoint lock.

In one example (Example 1), a multipoint lock is provided, the multipoint lock including a pivoting lock bolt including a fixed pivot point and a sliding pivot point; a translating lock bolt; a linkage coupled to and configured to pivot the pivoting lock bolt and to translate the translating lock bolt; an actuation mechanism configured to actuate the linkage and to effect pivoting of the pivoting lock bolt and translation of the translating lock bolt; and an input mechanism configured to receive user input and transmit the user input to the actuation mechanism, the user unput including shifting the input mechanism between an unlocked position and a locked position.

In another example (Example 2), further to Example 1, the translating lock bolt extends from the linkage.

In another example (Example 3), further to Example 1, the linkage is configured to collapse in response to actuation of the input mechanism from the locked position to the unlocked position and expand in response to actuation of the input mechanism from the unlocked position to the locked position.

In another example (Example 4), further to Example 1, the pivoting lock bolt includes a tapered end.

In another example (Example 5), further to Example 1, the multipoint lock further includes a moveable member operable to be coupled to the linkage and to be coupled to a hinged panel and move along the hinged panel along a single axis in response to movement of the linkage; and a fixed member operable to be coupled to the hinged panel in a fixed position relative to the hinged panel.

In another example (Example 6), further to Example 5, the fixed pivot point is defined by the fixed member.

In another example (Example 7), further to Example 1, the pivoting peripheral lock bolt includes a channel, wherein the moveable member interfaces with the pivoting peripheral lock bolt at the channel and the sliding pivot point is defined within the channel.

In another example (Example 8), further to Example 7, the moveable member is operable to cause the pivoting lock bolt to pivot about the sliding pivot point when the linkage is translated in a vertical direction.

In another example (Example 9), further to Example 8, the moveable member includes a pin that extends through the channel of the pivoting lock bolt.

In another example (Example 10), further to Example 9, the pivoting peripheral lock bolt is operable to pivot about the linkage pin and the linkage pin is operable to translate within the channel of the pivoting peripheral lock bolt when the linkage is translated in the vertical direction.

In another example (Example 11), further to Example 1, the pivoting peripheral lock bolt includes a chamfered edge, wherein the chamfered edge is substantially flush with the linkage when the multipoint lock is in an unlocked condition.

In one example (Example 12), a fenestration system is provided, the fenestration system including a hinged panel including a first surface, a second surface opposite the first surface, and a third surface extending between the first surface and the second surface; and a multipoint lock arranged with the hinged panel, the multipoint lock including: a pivoting lock bolt including a fixed pivot point and a sliding pivot point; a translating lock bolt; a linkage coupled to and configured to pivot the pivoting lock bolt and to translate the translating lock bolt; an actuation mechanism configured to actuate the linkage and to effect pivoting of the pivoting lock bolt and translation of the translating lock bolt; and an input mechanism configured to transfer rotation of the input mechanism to the actuation mechanism in response to a user shifting the input mechanism between an unlocked position and a locked position.

In another example (Example 13), further to Example 12, the pivoting lock bolt includes a pivot point about which the pivoting peripheral lock bolt is operable to rotate, the pivot point defined at a fixed position relative to the panel.

In another example (Example 14), further to Example 12, the linkage is operable to translate relative to the third surface of the hinged panel.

In another example (Example 15), further to Example 12, the third surface of the hinged panel defines a recess within which the multipoint lock is arranged.

In another example (Example 16), further to Example 15, the recess is 9 millimeters or less.

In another example (Example 17), further to Example 16, the multipoint lock is positioned substantially within the recess when the multipoint lock in an unlocked configuration.

In another example (Example 18), further to Example 12, the first translating lock bolt is a horizontally translating lock bolt and the second translating lock bolt is a vertically translating lock bolt.

In another example (Example 19), further to Example 18, the first translating lock bolt includes a plurality of horizontally translating lock bolts.

In another example (Example 20), further to Example 12, the fenestration system further includes a frame defining an opening operable to be covered by the hinged panel, wherein the frame includes slots into which each of the pivoting peripheral lock bolt and the vertically translating lock bolt extend when the multipoint lock is configured in a locked configuration.

In one example (Example 21), a method of operating a multipoint lock is provided, the method including rotating an input mechanism between an unlocked position and a locked position; transferring rotation of the input mechanism to an actuation mechanism; actuating a linkage in response to rotating the actuation mechanism; and pivoting a pivoting lock bolt and translating a vertically translating lock bolt by actuating the linkage, the pivoting lock including a fixed pivot point and a sliding pivot point.

In another example (Example 22), further to Example 21, actuating the linkage includes translating a linkage pin of the linkage through a slot of the pivoting peripheral lock bolt.

In another example (Example 23), further to Example 22, when the linkage pin is translated through a slot of the pivoting lock bolt, the pivoting lock bolt also rotates around the pin of the linkage.

While multiple, inventive examples are specifically disclosed, various modifications and combinations of features from those examples will become apparent to those skilled in the art from the following detailed description. Accordingly, the disclosed examples are meant to be regarded as illustrative in nature and not restrictive.

DETAILED DESCRIPTION

Various aspects of the present disclosure are directed toward apparatuses, systems, and methods that include a multipoint lock that may be used with a hinged door or window. In various examples, the multipoint locks, as discussed herein, help provide consistent weather performance and a secure engagement for security. This is accomplished by providing a low profile multi point lock, the multipoint lock including a pivoting lock bolt at a peripheral position of a hinged panel. In certain instances, the multipoint locks of the present disclosure may be implemented on existing systems as a retrofit or on new systems.

Figure 1:
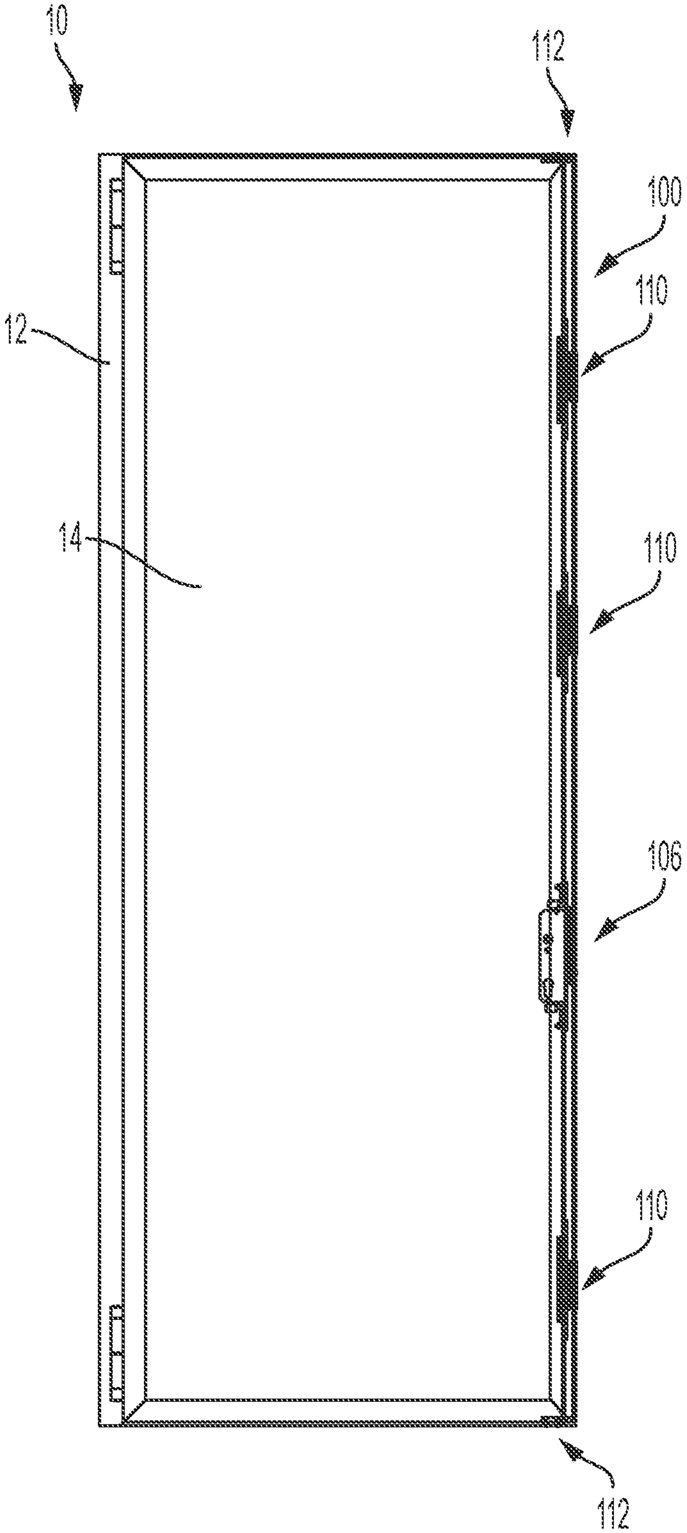
FIG. 1 is an illustration of a hinged panel including fenestration system with a multipoint lock assembly, according to some embodiments.
Figure 2:
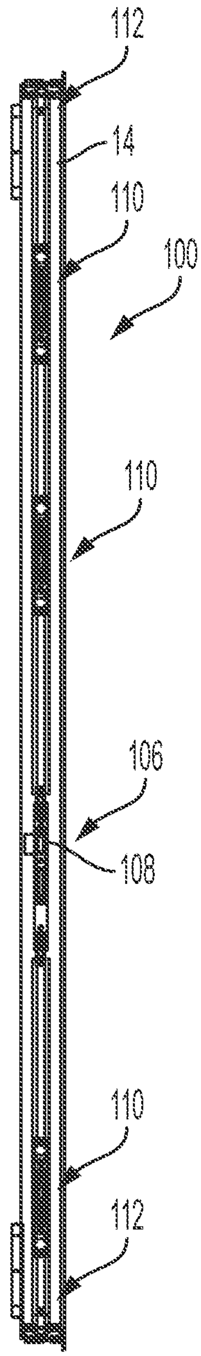
FIG. 2 is a side view of the hinged panel and multipoint lock assembly of FIG. 1, according to some embodiments.

FIG. 1 shows a fenestration system 10, according to some embodiments. As shown, the fenestration system 10 includes a frame 12 and a hinged panel 14. The hinged panel 14 may be implemented in a variety of fenestration unit configurations, including, but not limited to, those of doors and windows. The hinged panel 14 illustrated in FIG. 12 includes a hinged door for allowing and limiting ingress and egress. The hinged panel includes a multipoint lock assembly 100 that is operable to engage with the frame 12 in order to provide secure engagement of the hinged panel 14 to the frame 12. FIG. 2 illustrates the multipoint lock assembly 100 positioned on the side of a hinged panel. In some embodiments, the multipoint lock assembly 100 may interact with a second door component (such as a door jamb or a stationary door) that includes a strike plate(s) for each of the lock bolts of the multipoint lock assembly 100.

Figure 3A:
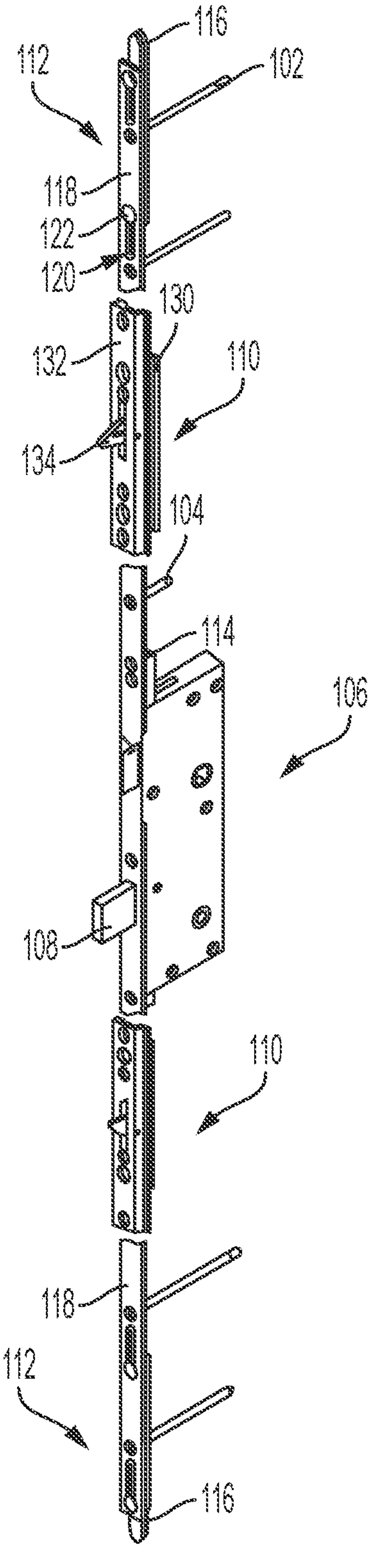
FIGS. 3A and 3B are illustrations of a multipoint lock assembly, according to some embodiments.

FIG. 3A shows the multipoint lock assembly 100 in more detail. The multipoint lock assembly 100 may be attached to an edge or perimeter of the hinged panel (see FIG. 2) by one or more bolts or attachment mechanisms. As shown in FIG. 3A, a first set of attachment mechanisms 102 and a second set of attachment mechanisms 104 are used to attach, connect, or couple the multipoint lock assembly 100 to an edge or perimeter of the hinged panel 14. It is understood that additional attachment mechanisms may be implemented to secure the multipoint lock assembly 100 to the hinged panel 14.

In some embodiments, the multipoint lock assembly 100 further includes an actuation mechanism 106, a primary lock bolt 108, at least one pivoting lock bolt subassembly 110, at least one translating lock bolt subassembly 112, and a linkage 114 coupled to and configured to actuate the pivoting lock bolt subassembly 110 and the translating lock bolt subassembly 112. Though shown in FIG. 3A, in some embodiments, the pair of lock bolt subassemblies 112 is omitted. Each of the various lock bolts and lock bolt subassemblies 108, 110, 112 may be actuated simultaneously with the actuation mechanism 106 via the linkage 114 which transfers motion from the actuation mechanism 106 to the pivoting lock bolt subassembly 110 and the translating lock bolt subassembly 112. Various actuation mechanisms 106 may be implemented, including but not limited to such actuation mechanisms shown and described in U.S. Pat. No. 10,669,755 to Ritzert issued Jun. 2, 2020, which is incorporated herein by reference in its entirety. The actuation mechanism 106 may extend along an edge of the hinged panel 14 (e.g., within a hole, space, recess, channel, and/or gap provided in the hinged panel 14).

In some embodiments, the actuation mechanism 106 is configured to actuate the linkage 114 and to effect pivoting of the pivoting lock bolt subassembly 110 and translation of the translating lock bolt subassembly 112. The actuation mechanism 106 is operable to receive input from an input mechanism 107 (e.g., a handle, knob, lever, motor, and so forth) configured to receive user input and transmit the user input to the actuation mechanism 106, the user input including shifting the input mechanism 107 between an unlocked position and a locked position.

Figure 3B:
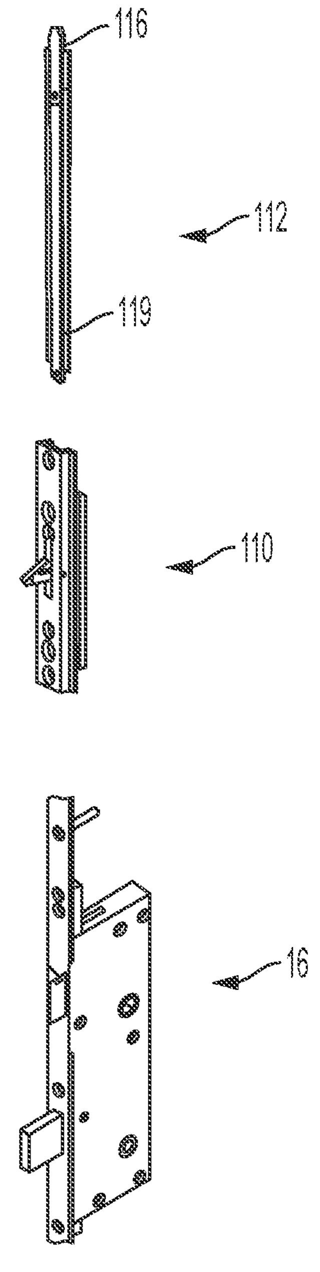
Figure 4A:
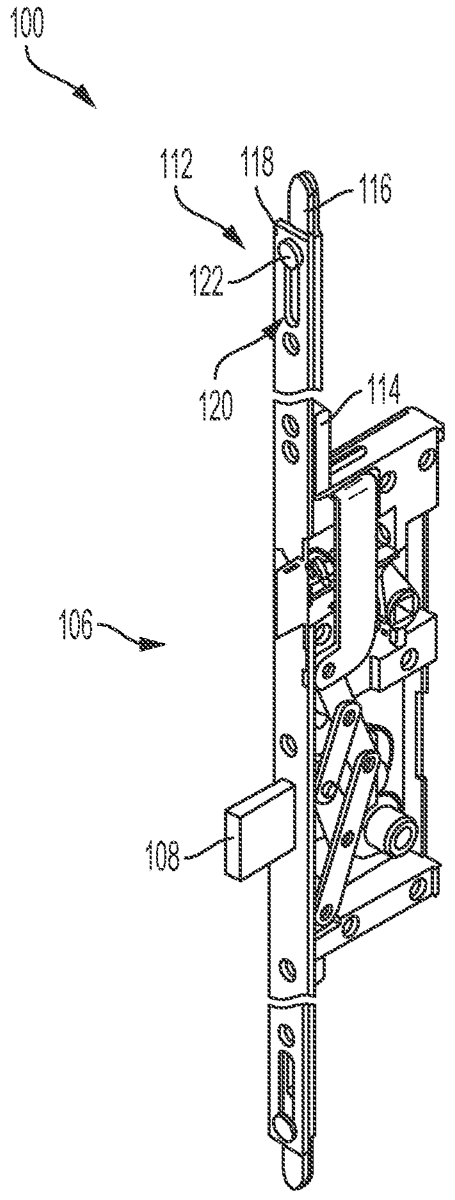
FIGS. 4A and 4B are illustrations of an actuation member and a translating lock bolt subassembly of the multipoint lock assembly, the translating lock bolt subassembly being in the locked configuration, according to some embodiments.
Figure 4B:
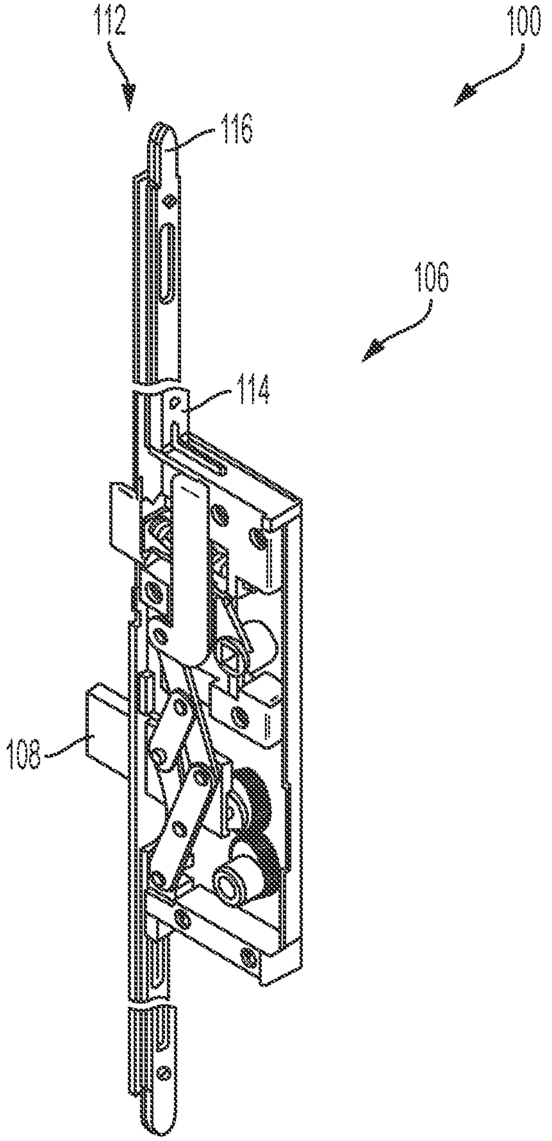
Figure 5A:
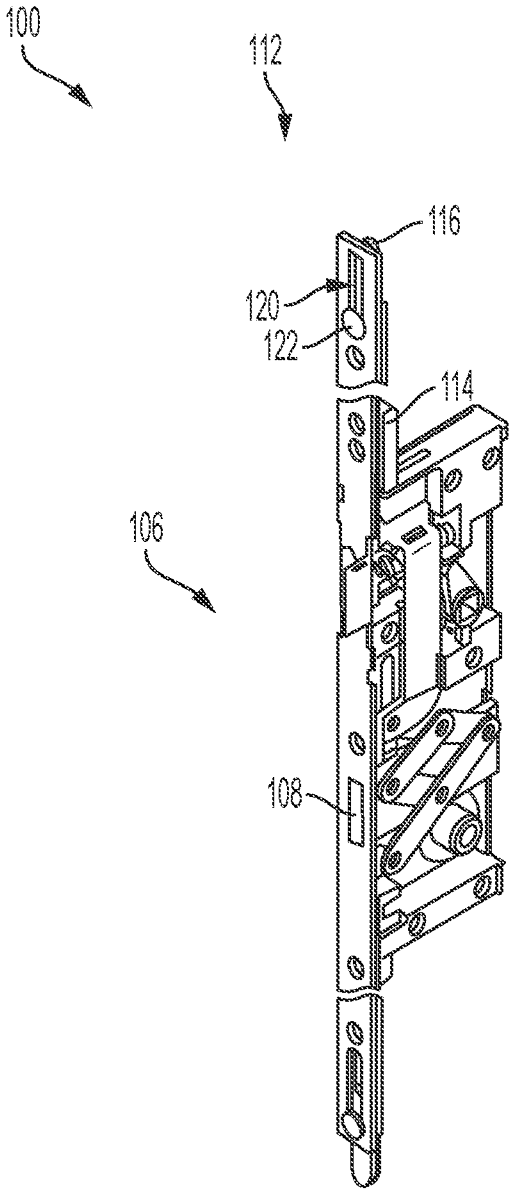
FIGS. 5A and 5B are illustrations of an actuation member and a translating lock bolt subassembly of the multipoint lock assembly, the translating lock bolt subassembly being in the unlocked configuration, according to some embodiments.
Figure 5B:
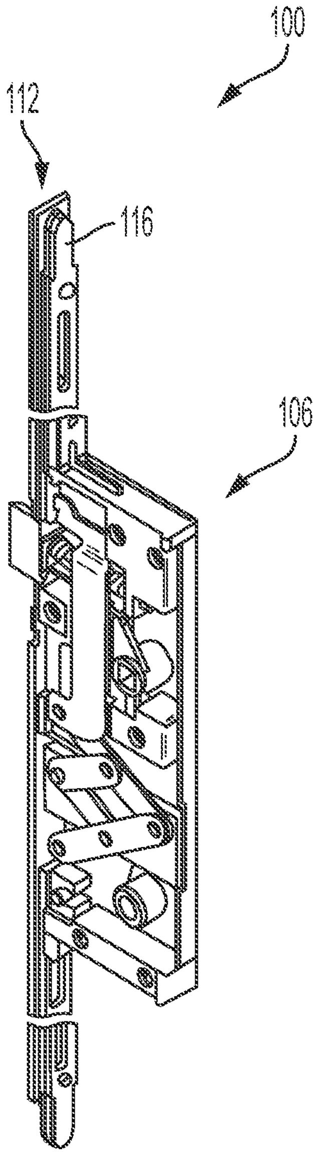

FIGS. 4A-4B are first and second views of the multipoint lock assembly 100 in a locked configuration and FIGS. 5A-5B are first and second views of the multipoint lock assembly 100 in an unlocked configuration, according to some examples. For simplicity, the multipoint lock assembly 100 is shown in FIGS. 4A-5B without the pivoting lock bolt subassembly 110 (the multipoint lock assembly 100 is shown with the pivoting lock bolt subassembly 110 in FIGS. 1-3). In FIGS. 4A-5B, the actuation mechanism 106 is shown with the translating lock bolt subassembly 112. In some embodiments, the translating lock bolt subassembly 112 is simultaneously actuated with the primary lock bolt 108 via the actuation mechanism 106. The actuation mechanism 106 is operable to actuate a linkage 114 that translates and imparts motion to the translating lock bolt subassembly 112 when the linkage 114 is translated (the linkage 114 also actuates the pivoting lock bolt subassembly 110, see FIG. 3A). As the linkage 114 is in an extended configuration (e.g., extended away from the actuation mechanism 106), the translating lock bolt subassembly 112 is in a locked configuration (FIGS. 4A-4B). When the linkage 114 is in a retracted configuration (e.g., retracted toward the actuation mechanism 106), the translating lock bolt subassembly 112 is in an unlocked configuration (FIGS. 5A-5B). Stated otherwise, the linkage 114 is configured to collapse in response to actuation of the input mechanism 107 from the locked position to the unlocked position and expand in response to actuation of the input mechanism 107 from the unlocked position to the locked position.

As shown, the translating lock bolt subassembly 112 includes a translating lock bolt 116 that is operable to engage with surrounding structure (e.g., the frame 12) and anchoring member 118 that is operable to be fixedly coupled to the hinged panel 14. The translating lock bolt 116 translates or slides (e.g., longitudinally) relative to the anchoring member 118 when the translating lock bolt 116 is actuated by the linkage 114. The anchoring member 118 substantially limits other movement of the translating lock bolt 116 in other directions (e.g., lateral movement, forward and backward movement into and away from the side of the hinged panel, and/or rotational movement). It is understood that in some embodiments, the anchoring member 118 is integral with the hinged panel 14 (e.g., integrally formed on the side of the hinged panel 14). The anchoring member 118 defines a channel 120 and the translating lock bolt 116 includes an engagement member 122 which engages with the channel 120. The engagement member 122 is operable to slide within the channel 120. The interface of the engagement member 122 and the channel 120 facilitates translation of the translating lock bolt 116 along a linear path. It is understood that the channel 120 may be positioned on the translating lock bolt 116 and the engagement member 122 may be positioned on the anchoring member 118. It is further understood that in some embodiments, the translating lock bolt 116 extends directly from the linkage 114 such that the linkage 114 is restrained by the anchoring member 118.

Various translating lock bolt configurations may be implemented and the disclosure is not meant to be limiting as to how the translating lock bolt may be implemented. For example, FIG. 3B illustrates an alternate version of a translating lock bolt subassembly 112. In this example, the translating lock bolt subassembly 112 does not include an anchoring member. Instead, the translating lock bolt subassembly 112 implements a sliding engagement feature 119 to maintain engagement in the hinged panel 14. For example, the sliding engagement feature 119 is a lip which is received and engages with the hinged panel 14 (e.g., a receiving channel). The sliding engagement feature 119 allows the translating lock bolt 116 to be securely retained to the hinged panel 14 such that it does not interfere with opening or closing of the hinged panel 14 within the frame 12. When the translating lock bolt 116 is actuated (e.g., translated), the pivoting lock bolt 134 is moved between the locked and unlocked configurations. The sliding engagement feature 119 the substantially limits other movement of the translating lock bolt 116 in other directions (e.g., lateral movement, forward and backward movement into and away from the side of the hinged panel 14, and/or rotational movement).

Referring now to FIGS. 6-9, the pivoting lock bolt assembly 110 is shown in greater detail. The pivoting lock bolt assembly 110 includes a fixed member 130, a moveable member 132, and a pivoting lock bolt 134. The moveable member 132 is operable to move relative to the fixed member 130. The relative movement between the fixed member 130 and the moveable member 132 facilitates pivoting of the pivoting lock bolt 134 (see FIGS. 11A-11D). The moveable member 132 is mechanically coupled to the linkage 114 such that movement of the linkage 114 results in movement of the moveable member 132. It is understood that in some embodiments that the moveable member 132 may be integral with the linkage 114 (not shown). The fixed member 130 is anchored to the hinged panel 14 and the moveable member 132 is operable to move relative to the fixed member 130 and the hinged panel 14.

Both the fixed member 130 and the moveable member 132 are rotatably coupled to the pivoting lock bolt 134. The fixed member 130 includes a first pin 136 that defines a first pivot point 138 and the moveable member 132 includes a second pin 140 that defines a second pivot point 142. As the moveable member 132 moves relative to the fixed member 130, the pivoting lock bolt 134 pivots about the first pivot point 138 and the second pivot point 142 (see FIGS. 11A-11D). This allows the linear motion of the linkage 114 to be translated into the rotational movement of the pivoting lock bolt 134, thus facilitating movement of the pivoting lock bolt 134 between a locked position and an unlocked position. The first pivot point 138 is a fixed pivot point in that the first end 170 (FIG. 12) of the pivoting lock bolt 134 is axially fixed. The second pivot point 142 is a sliding pivot point relative to the body of the pivoting lock bolt 134.

Figure 6:
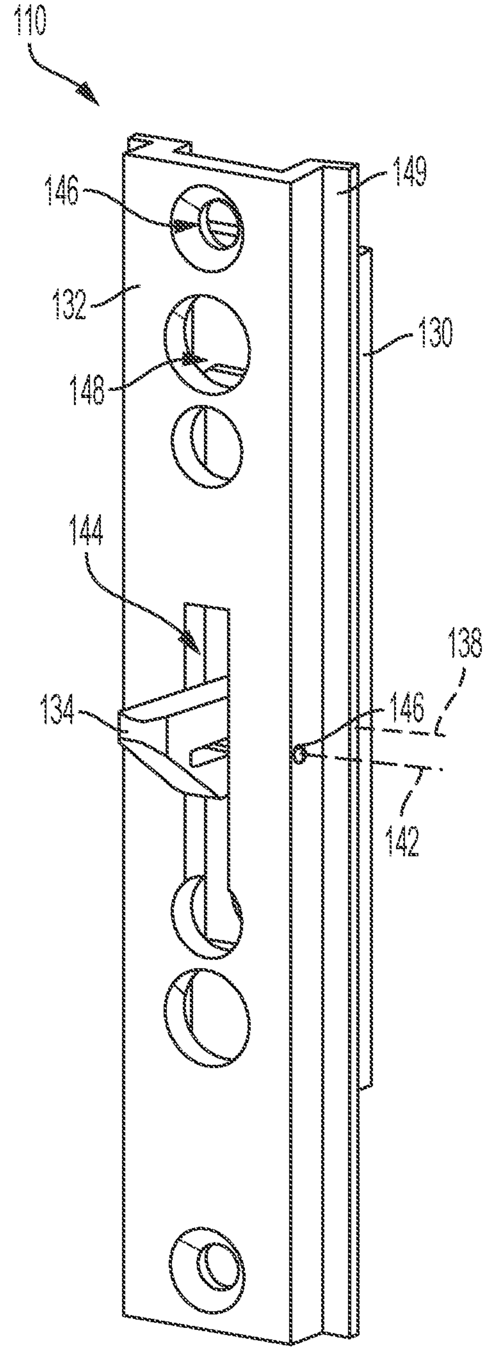
FIGS. 6, 7, 8, and 9 are illustrations of various views of a pivoting lock bolt subassembly, according to some embodiments.
Figure 9:
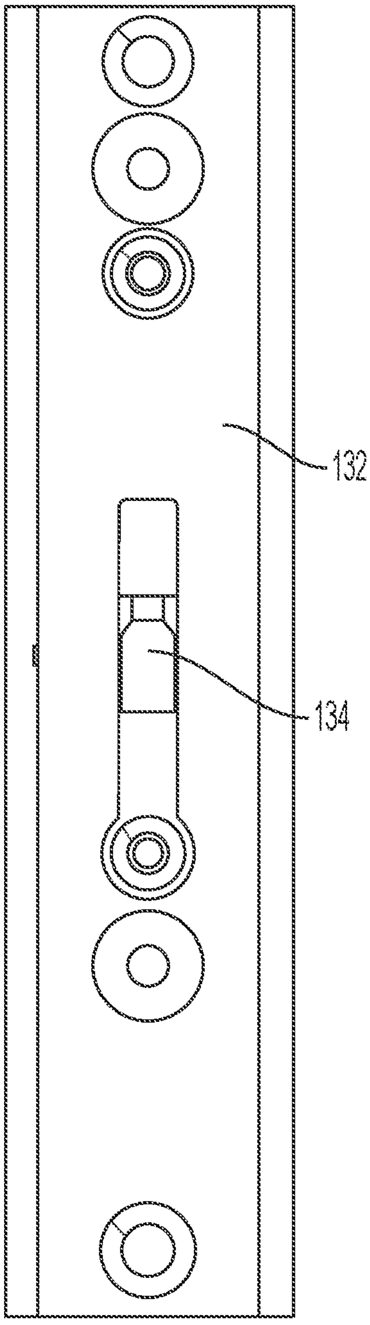

Referring more specifically to FIGS. 6 and 9, the moveable member 132 includes a channel 144 through which the pivoting lock bolt 134 extends when in the locked position as shown in FIG. 6. The second pin 140 extends through the pivoting lock bolt 134 in the channel 144. When the pivoting lock bolt 134 is in the unlocked position (see FIG. 11D), at least a portion of the pivoting lock bolt 134 is positioned in the channel 144. The moveable member 132 includes coupling features 146 (e.g., apertures through which fasteners extend to couple the moveable member 132 to other structures such as the linkage 114) and access features 148 (e.g., apertures through which access to other components such as the fixed member and its fasteners is available). The access features 148 may be implemented at original installation of the multipoint lock assembly 100, during removal, during maintenance, or for installation as a retrofit kit.

Referring to FIG. 6, the moveable member 132 is shown with a sliding engagement feature 149. The sliding engagement feature 149 allows the moveable member 132 to be constrained with respect to the hinged panel 14 except for in one dimension (e.g., longitudinally, vertically, or horizontally). In the embodiment illustrated, the sliding engagement feature 149 is a lip which is received and engages with the hinged panel 14 (e.g., a receiving channel). The sliding engagement feature allows the moveable member 132 to be securely retained to the hinged panel 14 such that it does not interfere with opening or closing of the hinged panel 14 within the frame 12. When the moveable member 132 is actuated (e.g., translated), the pivoting lock bolt 134 is moved between the locked and unlocked configurations.

Figure 7:
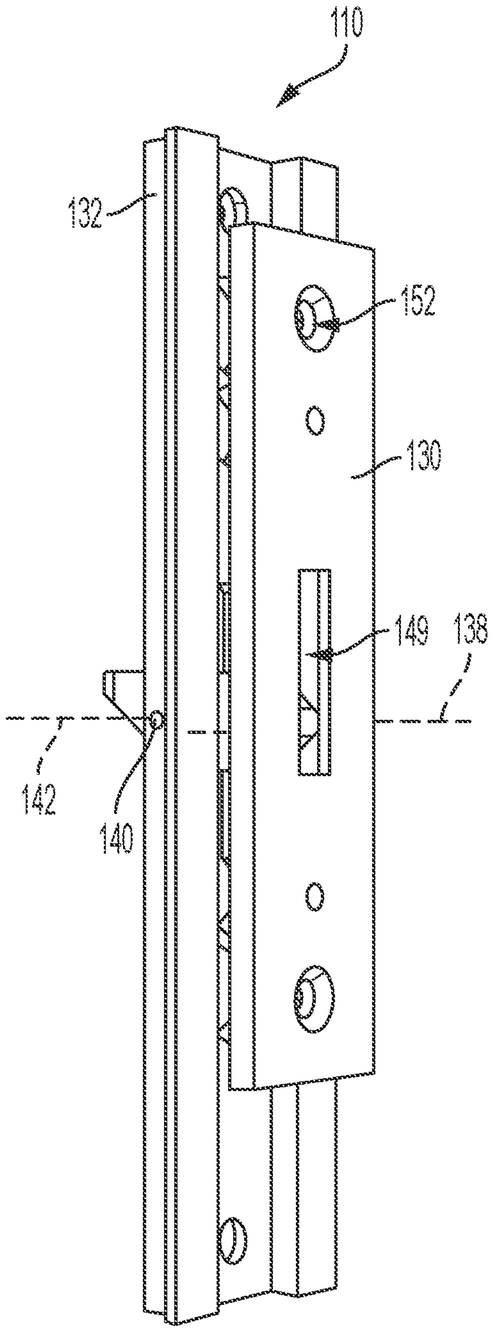
Figure 8:
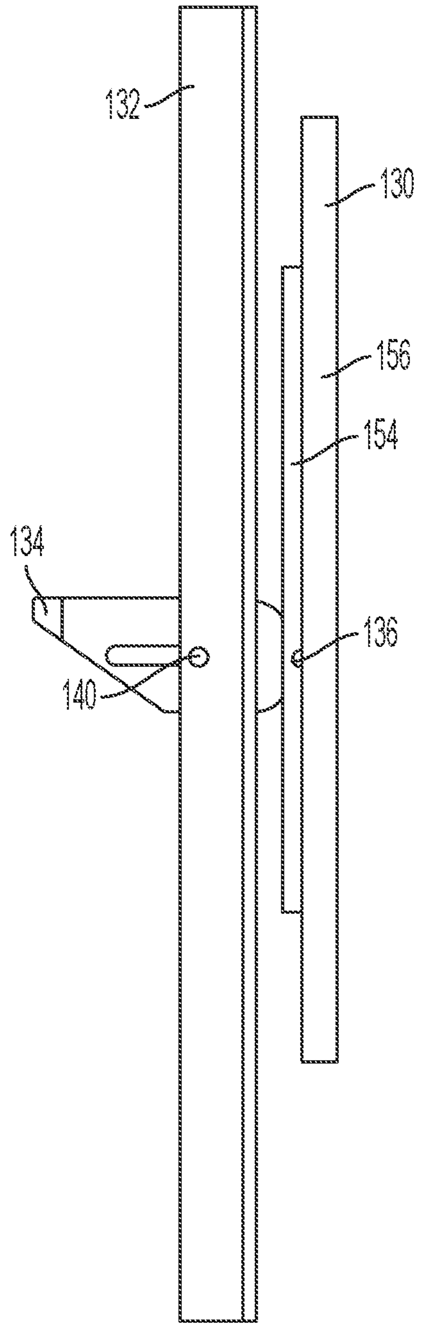
Figure 10:
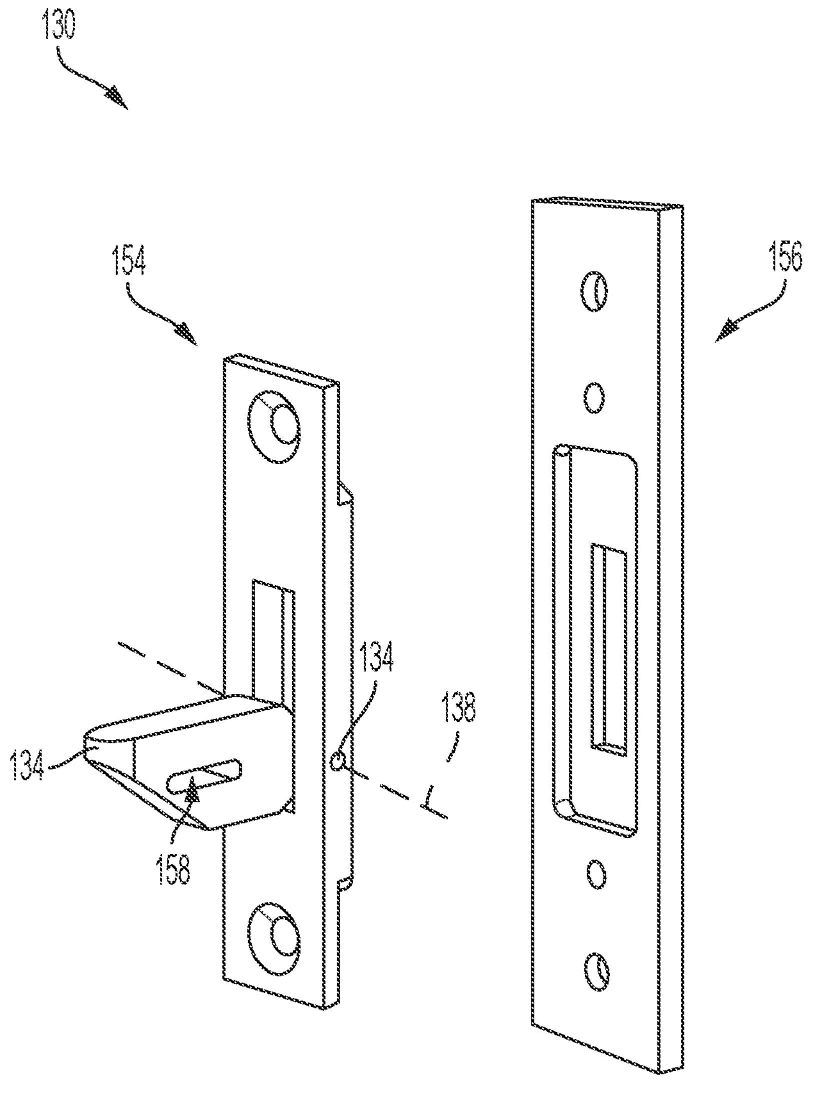
FIG. 10 is an illustration of a fixed member of a pivoting lock bolt subassembly, according to some embodiments.

Referring to FIGS. 7 and 10, the fixed member 130 includes a channel 150 within which at least a portion of the pivoting lock bolt 134 is positioned. The first pin 136 extends through the pivoting lock bolt 134 in the channel 150. The fixed member 130 includes coupling features 152 (e.g., apertures through which fasteners extend to couple the fixed member 130 to other structures such as the hinged panel 14). As shown in FIG. 10, in some embodiments, the fixed member 130 may include a first portion 154 and a second portion 156. The first portion 154 may be removeable from the second portion 156. In such embodiments, the first pin 136 couples the pivoting lock bolt 134 to the first portion 154, such that when the first portion 154 is removed from the second portion 156, the pivoting lock bolt 134 is removed also. When the first portion 154 is positioned with the second portion 156, the first portion 154 may not sit flush with the second portion 156. For example, as shown in FIG. 8, the first portion 154 is raised from the second portion 156. This allows the first pin 136 and the first pivot point 138 to be positioned further away from the hinged panel 14 to provide clearance for the pivoting motion of the pivoting lock bolt 134 while maintaining an overall slim profile of the fixed member 130. And, thus, the multipoint lock assembly 100 is configured such that it can be accommodated on existing door systems and/or allow for tight closure of the hinged panel (e.g., weather sealing). In different terms, the multi point lock assembly 100 takes up little gap space and may be installed on doors with relatively little to no modification to the edge of the vent panel and in fenestration units that have very tight clearances between the vent panel and the jamb.

Referring to FIGS. 10-13, the pivoting lock bolt 134 includes a sliding channel 158 through which the second pin 140 is positioned (see FIGS. 6 and 11A-11D). The sliding channel 158 allows the second pin 140 to slide within the sliding channel 158. As the pivoting lock bolt 134 transitions between the locked and the unlocked configurations, the pivoting lock bolt 134 will both rotate around the second pin 140 and the second pin 140 will slide within the sliding channel 158 of the pivoting lock bolt 134.

Figures 11A, 11B, 11C, 11D:
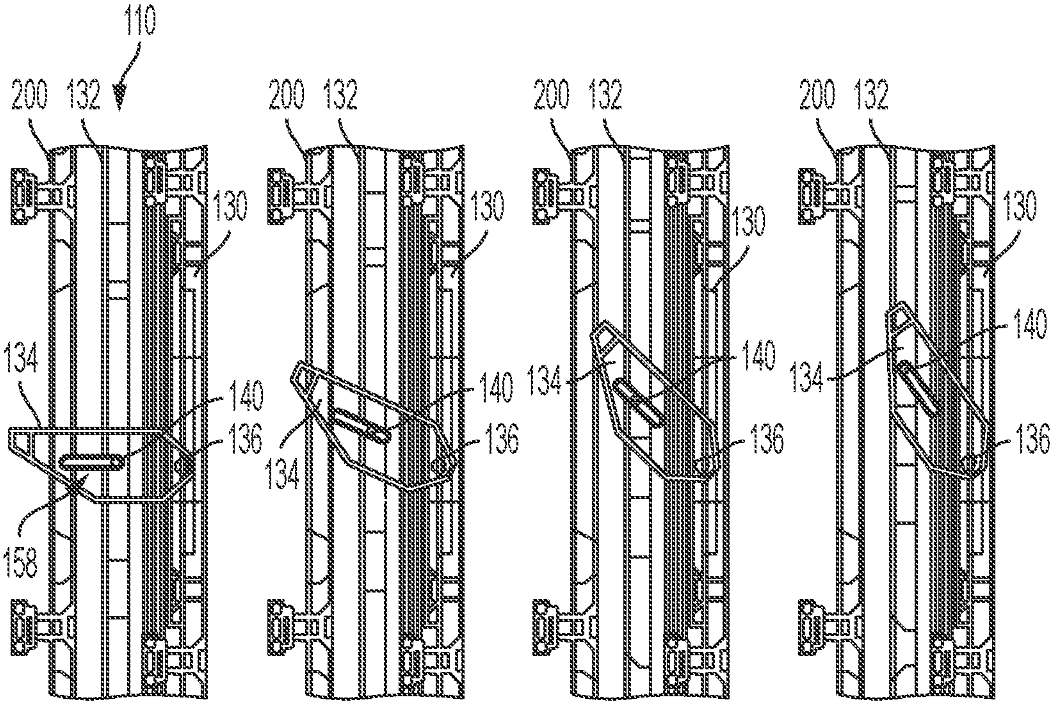
FIGS. 11A, 11B, 11C, and 11D are illustrations of a pivoting lock bolt subassembly transitioning between a locked configuration and an unlocked configuration, according to some embodiments.

Referring more specifically to FIGS. 11A-11D, the transition of the pivoting lock bolt 134 is shown as it transitions between the locked and unlocked configurations. For example, FIG. 11A shows the pivoting lock bolt 134 in the locked configuration. The second pin 140 is positioned toward a first end 160 of the sliding channel 158 (see FIG. 12) when the pivoting lock bolt 134 is in the locked configuration. The pivoting lock bolt 134 is retained in this position by the moveable member 132 which constrains the pivoting lock bolt 134 via the second pin 140 positioned through the sliding channel 145. When in the locked configuration, the pivoting lock bolt 134 is extending away from the hinged panel 14 and into the strike plate 200.

Referring to FIG. 11B, as the moveable member 132 is transitioned, the second pin 140 translates toward a second end 162 of the sliding channel 158. As the moveable member 132 is transitioned and the second pin 140 slides within the sliding channel 158, the pivoting lock bolt 134 also rotates about the second pin 140. Thus, the pivoting lock bolt 134 both translates relative to the second pin 140 and rotates about the second pin 140. The axis of rotation is defined by the second pin 140, and because the second pin 140 slides relative to the pivoting lock bolt 134, the axis of rotation of the pivoting lock bolt 134 in non-fixed or transitory. As the moveable member 132 is transitioned and the pivoting lock bolt 134 pivots about the second pin 140, the pivoting lock bolt also rotates around the first pin 134, which defines a stationary pivot point relative to the pivoting lock bolt 134.

FIG. 11C illustrates further rotation of the pivoting lock bolt 134 as the moveable member 132 is further transitioned. The second pin 140 slides further withing the sliding channel 158 allowing for the further pivoting of the pivoting lock bolt 134 away from the strike plate 200.

FIG. 11D illustrates the pivoting lock bolt 143 in the retracted or unlocked configuration. The second pin 140 is positioned at the end of the sliding channel 150 and the pivoting lock bolt 134 is rotated away from the strike plate 100 and sufficiently into the hinged panel 14 to allow for the hinged panel to be swung open without the pivoting lock bolt 134 contacting adjacent structure.

The progression of the pivoting of the pivoting lock bolt 134 and the sliding of the second pin 140 within the sliding channel 158 to facilitate transition of the pivoting lock bolt 134 between the locked and unlocked configurations can be seen in FIGS. 11A-11D. When the pivoting lock bolt 134 is in the unlocked configuration, the second pin 140 is positioned toward the second end 162 of the sliding channel 158. The sliding channel 158 is illustrated as being substantially parallel with the walls of the pivoting lock bolt 134, however, it is understood that the sliding channel 158 may be disposed within the pivoting lock bolt 134 at various angles and positions. In some embodiments, the sliding channel is linear. In some embodiments, the sliding channel includes at least some curved portions. The configuration and geometry of the sliding channel 158 and its positioning within the pivoting lock bolt 134 may provide various activation profiles for the pivoting lock bolt assembly 110 (e.g., how far the linkage 114 and moveable member 132 must translate to provide full engagement of the pivoting lock bolt 134). These geometries may be tuned to support other systems of the multipoint lock assembly 100 (e.g., the translating lock bolt subassembly 112 to ensure sufficient travel of the translating lock bolt 116 to engage with the corresponding structure).

Figure 12:
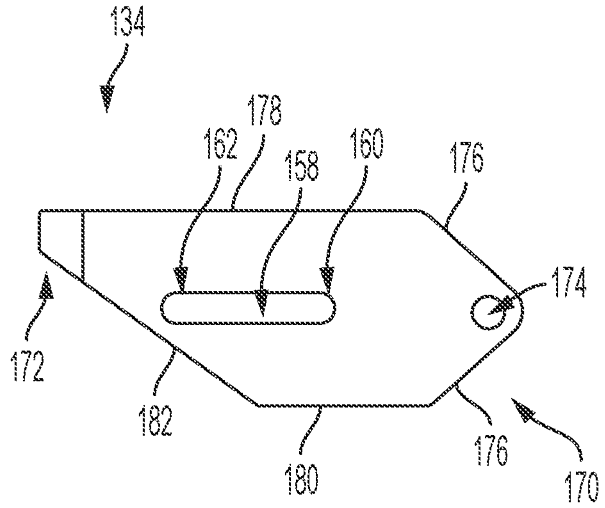
FIGS. 12, 13, and 14 are illustrations of various views of a pivoting lock bolt of a pivoting lock bolt subassembly, according some embodiments.
Figure 13:
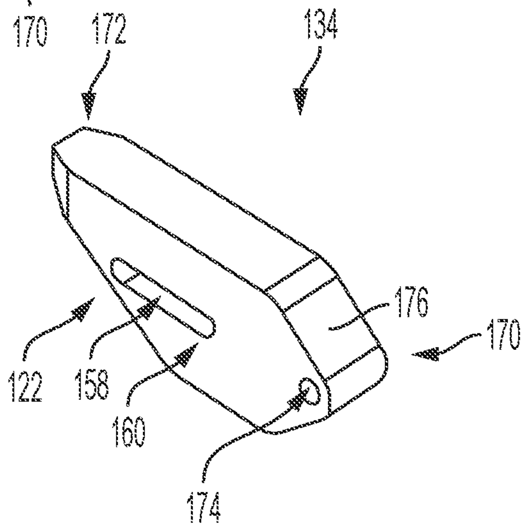
Figure 14:
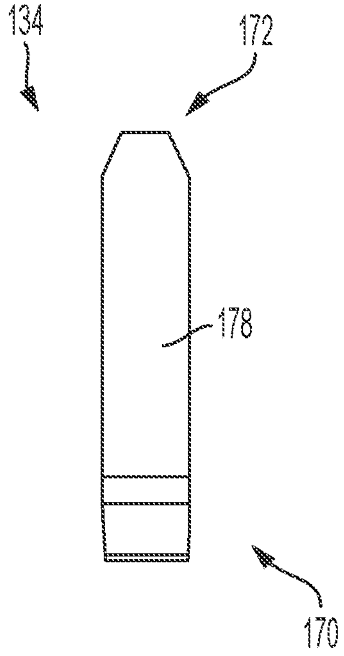

As is illustrated in FIG. 11D, when the pivoting lock bolt 134 is in the unlocked configuration, the pivoting lock bolt 134 is substantially positioned within the profile of the anchoring member 118 and the moveable member 132. The geometries of the pivoting lock bolt 134 facilitate the low profile of the pivoting lock bolt subassembly 110. FIGS. 12-14 provide various views of the pivoting lock bolt 134. For example, FIG. 12 illustrates the pivoting lock bolt 134 with a first end 170 and a second end 172. The first end 170 includes an aperture 174 through which the first pin 136 extends. The first pivot point 138 as previously discussed is defined through the aperture 174 on the first end 170 of the pivoting lock bolt 134. The second end 172 is operable to extend out from the hinged panel 14 in the locked configuration to engage a corresponding structure (e.g., a strike plate 200 on the frame 12) (see FIGS. 11A-11D).

The first end 170 includes at least one angled surface 176 that is operable to sit flush or recessed within the anchoring member 118 when the pivoting lock bolt 134 is in the unlocked configuration (See FIG. 11D). The angled surface 176 may be positioned at about 135 degrees relative to a top surface 178 or a bottom surface 180 of the pivoting lock bolt 134. For example, the angled surface 176 may be a chamfer on the first end 170 with the top and/or bottom surface 178, 180. As illustrated in FIGS. 12-14, the pivoting lock bolt 134 includes two angled surfaces 176 on the first end 170 with the aperture 174 positioned near the first end 170 between the angled surfaces 176.

The second end 172 of the pivoting lock bolt 134 includes a second angled surface 182. The second angled surface 182 is operable to sit flush or recessed within the moveable member 132 when the pivoting lock bolt 134 is in the unlocked configuration (See FIG. 11D). This allows the hinged panel 14 to be opened and closed without the pivoting lock bolt 134 contacting other structures such as the strike plate 200 or the frame 12 (e.g., facilitates a compact retracted arrangement within the door edge profile). The second angled surface 182 may be positioned at about 135 degrees relative to a top surface 178 or a bottom surface 180 of the pivoting lock bolt 134. The angle of the second angled surface 182 can be configured at various angles depending on the depth of the pivoting lock bolt assembly 110 and is optimized to provide sufficient structural support.

Referring to FIG. 14, the width of the pivoting lock bolt 134 may be tapered at the second end 172 of the pivoting lock bolt 134. The tapered second end 172 of the pivoting lock bolt 134 allows the tapered surface to engage with an opposing structure (e.g., the strike plate 200) during transition from the unlocked to the locked configuration. If the pivoting lock bolt 134 is not in the exact position to slide into the recess of the strike plate 200, the tapered surface of the tapered second end 172 of the pivoting lock bolt 134 is operable to push the pivoting lock bolt 134 into the appropriate position for engaging with the strike plate 200 in the locked configuration.

Figure 15:
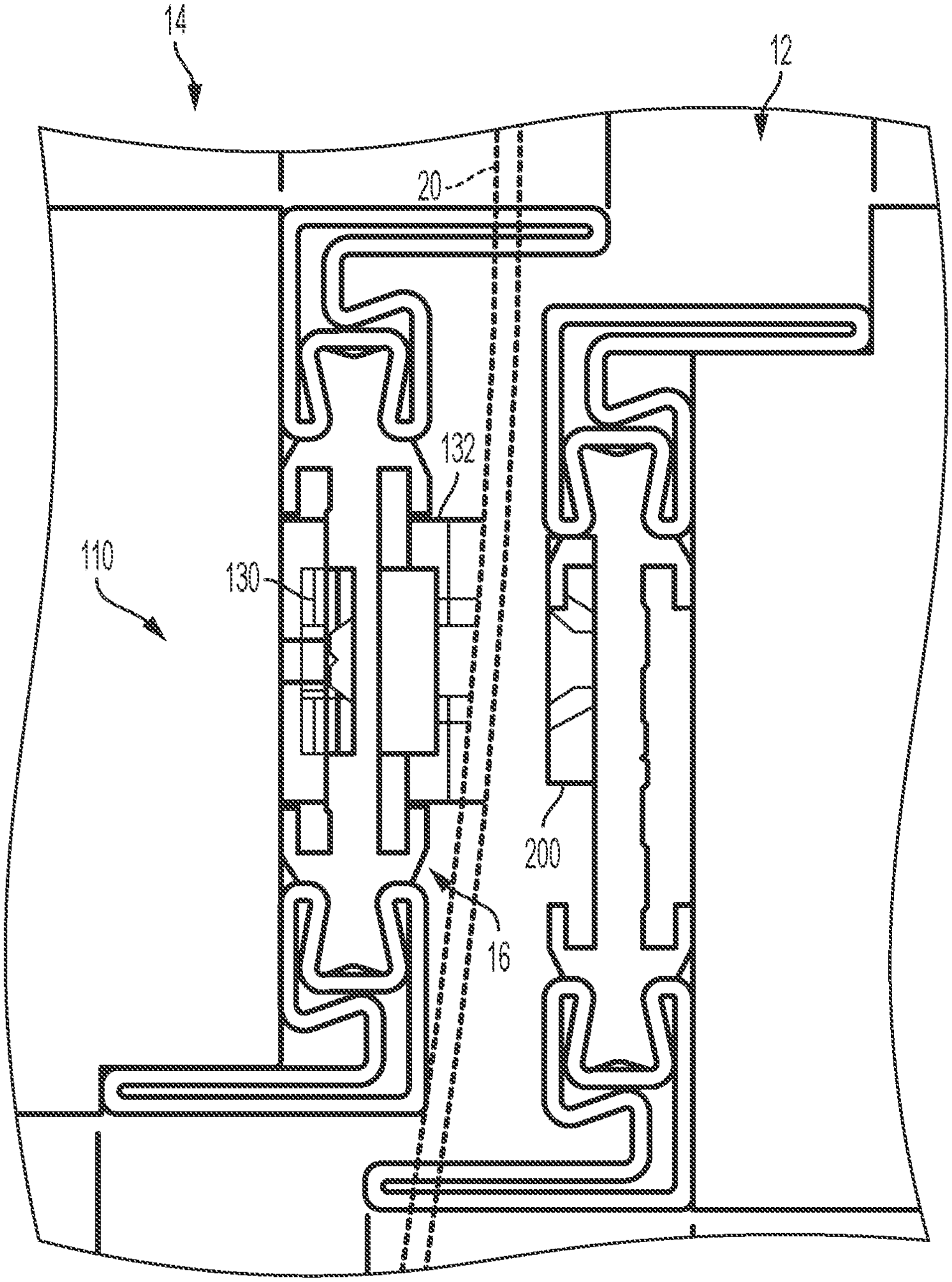
FIG. 15 is an illustration of a section view of a hinged panel and a frame showing the travel path of a pivoting lock bolt subassembly as the hinged panel is pivoted open and closed, according to some embodiments.

Referring to FIG. 15, a cross section of a portion of a hinged panel 14 and a portion of a frame 12 are illustrated. The pivoting lock bolt subassembly 110 of the multipoint lock assembly 100 is shown positioned on the hinged panel 14. The pivoting lock bolt subassembly 110 is positioned in a recess 16 of the hinged panel 14. The recess 16 is about 12 mm deep and the pivoting lock bolt assembly 110 includes a profile that is operable to be substantially positioned within the recess 16 when in the unlocked configuration. The profile provided by the recess 16 and the pivoting lock bolt subassembly 110 facilitates the opening and closing of the hinged panel 14 without the pivoting lock bolt subassembly 110 interfering with the frame 12 when the pivoting lock bolt subassembly 110 is in the unlocked configuration. The low profile of the pivoting lock bolt subassembly 110 also allows for weather stripping 18 to be implemented with the fenestration system 10 and the hinged panel 14 to properly engage with the weather stripping 18 to provide thermal transfer properties and limit air flow through the fenestration system 10 when the hinged panel 14 is closed. As illustrated in FIG. 15, travel lines 20 are shown demonstrating the path of travel of the outermost portions of the pivoting lock bolt subassembly 110 during opening and closing of the hinged panel 14 of the fenestration system 10. The profile of the pivoting lock bolt subassembly 110 is such that the pivoting lock bolt subassembly 110 does not interfere with the frame 12 when the clearance between the frame 12 and the hinged panel 14 is provided as a low-clearance system. For example, the pivoting lock bolt subassembly 110 does not interfere with the frame 12 when the clearance between the frame 12 and the hinged panel 14 is about 10 mm or less.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

What is claimed is:

1. A multipoint lock comprising:
- a pivoting lock bolt having a first end and a second end, the pivoting lock bolt including a single fixed pivot point located at the first end and a sliding pivot point; wherein the pivoting bolt includes a closed channel, the longitudinal axis of the closed channel parallel with the longitudinal axis of the pivoting bolt, and the sliding pivot point is defined within the closed channel;
- a translating lock bolt;
- a linkage coupled to and configured to pivot the pivoting lock bolt and to translate the translating lock bolt;
- an actuation mechanism configured to actuate the linkage and to effect pivoting of the pivoting lock bolt and translation of the translating lock bolt; and
- an input mechanism configured to receive user input and transmit the user input to the actuation mechanism, the user input including shifting the input mechanism between an unlocked position and a locked position.

2. The multipoint lock of claim 1, wherein the translating lock bolt extends from the linkage.

3. The multipoint lock of claim 1, wherein the linkage is configured to collapse in response to actuation of the input mechanism from the locked position to the unlocked position and expand in response to actuation of the input mechanism from the unlocked position to the locked position.

4. The multipoint lock of claim 1, wherein the pivoting lock bolt includes a tapered end.

5. The multipoint lock of claim 1, further comprising:
- a moveable member operable to be coupled to the linkage and to be coupled to a hinged panel and move along the hinged panel along a single axis in response to movement of the linkage; and
- a fixed member operable to be coupled to the hinged panel in a fixed position relative to the hinged panel.

6. The multipoint lock of claim 5, wherein the fixed pivot point is defined by the fixed member.

7. The multipoint lock of claim 6, wherein the moveable member interfaces with the pivoting lock bolt at the channel.

8. The multipoint lock of claim 7, wherein the moveable member is operable to cause the pivoting lock bolt to pivot about the sliding pivot point when the linkage is translated in a vertical direction.

9. The multipoint lock of claim 8, wherein the moveable member includes a pin that extends through the channel of the pivoting lock bolt.

10. The multipoint lock of claim 9, wherein the pivoting lock bolt is operable to pivot about the pin and the pin is operable to translate within the channel of the pivoting lock bolt when the linkage is translated in the vertical direction.

11. The multiple point lock of claim 1, wherein the pivoting lock bolt includes a chamfered edge, wherein the chamfered edge is substantially flush with the linkage when the multipoint lock is in an unlocked condition.

12. The multipoint lock of claim 1, wherein the closed channel extends between the first end and the second end.

13. The multipoint lock of claim 12, wherein the closed channel is located between the fixed pivot point and the second end.

14. The multipoint lock of claim 1, wherein the actuation mechanism is not directly in contact with the pivoting lock bolt.

15. The multipoint lock of claim 1, wherein the multipoint lock further comprises a moveable member operable to be coupled to the linkage, the moveable member including a slot, the pivoting lock bolt extending through the slot, the moveable member translating and directly effecting pivoting of the pivoting lock bolt.

16. A fenestration system comprising:
- a hinged panel including a first surface, a second surface opposite the first surface, and a third surface extending between the first surface and the second surface; and
- a multipoint lock arranged with the hinged panel, the multipoint lock including:
- a pivoting lock bolt including a fixed pivot point, a sliding pivot point, and a translating lock bolt; wherein the pivoting bolt includes a closed channel, the longitudinal axis of the closed channel parallel with the longitudinal axis of the pivoting bolt, and the sliding pivot point is defined within the closed channel;

a linkage coupled to and configured to pivot the pivoting lock bolt and to translate the translating lock bolt;

an actuation mechanism directly coupled to the linkage and configured to actuate the linkage and to effect pivoting of the pivoting lock bolt and translation of the translating lock bolt;

an input mechanism configured to transfer rotation of the input mechanism to the actuation mechanism in response to a user shifting the input mechanism between an unlocked position and a locked position.

17. The system of claim 16, wherein the pivoting lock bolt includes a pivot point about which the pivoting lock bolt is operable to rotate, the pivot point defined at a fixed position relative to the panel.

18. The system of claim 16, wherein the linkage is operable to translate relative to the third surface of the hinged panel.

19. The system of claim 16, wherein the third surface of the hinged panel defines a recess within which the multipoint lock is arranged.

20. The system of claim 19, wherein the recess is 12 millimeters or less.

21. The system of claim 20, wherein the multipoint lock is positioned substantially within the recess when the multipoint lock in an unlocked configuration.

22. The system of claim 16, wherein the translating lock bolt includes a first translating lock bolt and a second translating lock bolt, wherein the first translating lock bolt is a horizontally translating lock bolt and the second translating lock bolt is a vertically translating lock bolt.

23. The system of claim 22, wherein the first translating lock bolt includes a plurality of horizontally translating lock bolts.

24. The system of claim 16, further comprising a frame defining an opening operable to be covered by the hinged panel, wherein the frame includes slots into which each of the pivoting lock bolt and the vertically translating lock bolt extend when the multipoint lock is configured in a locked configuration.

* * * * *